United States Patent [19]
Hilbert et al.

[11] Patent Number: 5,886,133
[45] Date of Patent: Mar. 23, 1999

[54] PRODUCTION OF PARTICULAR POLYESTERS USING A NOVEL CATALYST SYSTEM

[75] Inventors: Samuel D. Hilbert, Jonesborough; Thomas G. Davis, Kingsport, both of Tenn.

[73] Assignee: Eastman Chemical Company, Kingsport, Tenn.

[21] Appl. No.: 730,255

[22] Filed: Oct. 15, 1996

Related U.S. Application Data

[63] Continuation of Ser. No. 362,387, Dec. 22, 1994, abandoned.

[51] Int. Cl.$^6$ ................................................ C08G 63/78
[52] U.S. Cl. ................... 528/279; 528/272; 528/275; 528/280; 528/286; 528/300; 528/301; 528/302; 528/308; 528/308.6; 428/35.7
[58] Field of Search ................... 528/272, 275, 528/279, 280, 286, 300, 301, 302, 308, 308.6; 428/35.7

[56] References Cited

U.S. PATENT DOCUMENTS

| | | | |
|---|---|---|---|
| 3,794,592 | 2/1974 | Winters et al. | 252/182 |
| 3,907,754 | 9/1975 | Tershansy et al. | 260/75 |
| 3,962,189 | 6/1976 | Russin et al. | 260/75 |
| 4,025,492 | 5/1977 | Binsack et al. | 260/75 |
| 4,136,089 | 1/1979 | Bier et al. | 528/309 |
| 4,150,215 | 4/1979 | Kelley | 528/272 |
| 4,176,224 | 11/1979 | Bier et al. | 528/309 |
| 4,208,527 | 6/1980 | Horlbeck et al. | 528/279 |
| 4,238,593 | 12/1980 | Duh | 528/272 |
| 4,260,735 | 4/1981 | Bander et al. | 528/279 |
| 4,356,299 | 10/1982 | Cholod et al. | 528/279 |
| 4,359,580 | 11/1982 | Grasso | 549/79 |
| 4,420,581 | 12/1983 | McFarlane et al. | 524/431 |
| 4,745,174 | 5/1988 | Pruett et al. | 528/289 |
| 4,790,581 | 12/1988 | Boswell et al. | 292/264 |
| 4,999,418 | 3/1991 | Krutak et al. | 528/272 |
| 5,252,699 | 10/1993 | Chamberlin et al. | 528/289 |
| 5,340,910 | 8/1994 | Chamberlin et al. | 528/289 |

FOREIGN PATENT DOCUMENTS 0 634 435  1/1995  European Pat. Off. .

OTHER PUBLICATIONS

R. E. Wilfong, *Journal of Polymer Science*, 54 385 (1961).
*J. Polymer Sci. A2*, vol. 6 (1968) by Adams and Stein.
Research Disclosure, vol. 167, No. 010, Mar. 1978, Havant GB, page 4, Anonymously: "Titanium catalyst for polyester synthesis".

*Primary Examiner*—Samuel A. Acquah
*Attorney, Agent, or Firm*—Betty J. Boshears; Harry J. Gwinnell

[57] ABSTRACT

This invention relates to a process of producing a moldable polyethylene terephthalate or modified polyethylene terephthalate having an inherent viscosity greater than 0.6 dL/g comprising reacting the diacid component with the diol component such that a combination of a titanium-based catalyst and a phosphorus-based catalyst is used during the polycondensation steps.

32 Claims, No Drawings

PRODUCTION OF PARTICULAR POLYESTERS USING A NOVEL CATALYST SYSTEM

This is a file wrapper continuation of pending prior application Ser. No. 08/362,387 filed on Dec. 22, 1994, now abandoned of Samuel D. Hilbert and Thomas G. Davis for "PRODUCTION OF PARTICULAR POLYESTERS USING A NOVEL CATALYST SYSTEM".

FIELD OF THE INVENTION

This invention relates to a process for preparing modified or unmodified poly(ethylene terephthalate) using a titanium/phosphorus-based catalyst system.

BACKGROUND OF THE INVENTION

Poly(ethylene terephthalate) may be derived from a process well known in the art comprising direct esterification of ethylene glycol and terephthalic acid. It may also be derived from a process comprising carrying out an ester interchange between ethylene glycol and dimethyl terephthalate to form bis-2-hydroxy ethyl terephthalate which is polycondensed to poly(ethylene terephthalate) under reduced pressure and at elevated temperatures.

Problems have also been encountered in the manufacture of poly(ethylene terephthalate) by the ester interchange reaction and by direct esterification reaction. However, this material is slow with respect to ester interchange and is many times impractical with respect to commercial operations. Therefore, it is typical to employ the use of a catalyst during these reactions.

Typical catalyst or catalyst systems for polyester condensation are well-known in the art. For example, catalysts disclosed in U.S. Pat. Nos. 4,025,492; 4,136,089; 4,176,224; 4,238,593; and 4,208,527, incorporated herein by reference, are deemed suitable in this regard. Further, R. E. Wilfong, *Journal of Polymer Science*, 54 385 (1961) sets forth typical catalysts which are useful in polyester condensation reactions.

However, many of these catalysts do not produce finished polyester which has the desired clarity or color.

U.S. Pat. No. 3,794,592 discloses a method of making polyesters suitable for use in making polyurethanes. More particularly, it discloses a method of making polyesters which have a reduced or controlled rate of reaction with isocyanates. Titanium may be used as a possible catalyst in the esterification and transesterification reactions. Phosphoric acid may be added after the esterification or condensation reaction has been completed. The molecular weight of these products are from about 500 to 10,000 and would not be useful in molding applications.

U.S. Pat. No. 3,907,754 discloses a catalyst system for the production of poly(ethylene terephthalate) which comprises, in combination, salts of manganese and cobalt with acetyl triisopropyl titanate and a phosphate ester.

U.S. Pat. No. 4,260,735 discloses the use of an alkanolamine titanium chelate catalyst to esterify and polycondense aromatic polycarboxylic acids or anhydrides, such as terephthalic acid, with a glycol, such as ethylene glycol, at low glycol to acid reactant ratios. The objective of this invention is to make possible commercial production of polyesters with low ether contents, without the addition of any inhibitor to suppress formation of DEG.

U.S. Pat. No. 4,150,215 discloses a process for preparing high molecular weight polyester resins by reacting ethylene glycol with terephthalic acid in the absence of a catalyst and polymerizing the product under solid state polymerization condition.

U.S. Pat. No. 3,962,189 discloses a catalyst-inhibitor system for the polymerization of poly(ethylene terephthalate) comprising a combination of organic or inorganic salts of manganese and cobalt, titanium alkoxides, organic salts of alkali metals, or alkaline earth metals, and a phosphate ester.

U.S. Pat. No. 4,356,299 discloses a poly(ethylene terephthalate) polycondensation catalyst system comprising a catalyst metal in the form of an alkyl titanate and an antimony compound.

Previously, the catalyst systems useful for making poly (ethylene terephthalate) of the prior art employed titanium-based catalysts, phosphorus-based compounds, usually in combination with manganese and/or antimony.

Therefore, there has been a need in the art to have a catalyst system which speeds up the reaction so that it is useful for economical purposes and for making a range of molecular weights useful for molding purposes but which also results in a condensation polymer having good clarity and color. Furthermore, environmental concerns demand that the level of catalyst metals be decreased or minimized which is achieved by using the process or this invention.

Heretofore, a catalyst system containing low amounts of one or more alkyl titanates in combination with a phosphorus-based compound in order to make poly(ethylene terephthalate) or modified poly(ethylene terephthalate) of sufficient molecular weight to be useful in molding applications has been unknown.

SUMMARY OF THE INVENTION

This invention involves the use of a catalyst system which has the advantages of the prior art with respect to the catalyst system which promotes esterification or transesterification and polycondensation and molecular weight buildup while maintaining good color and clarity.

This invention relates to a process of producing a moldable polyethylene terephthalate or modified polyethylene terephthalate having an inherent viscosity greater than 0.65 dL/g comprising:

reacting a diacid component further comprising at least 65 mole % terephthalic acid or a diester component comprising at least 65 mole % $C_1$–$C_4$ dialkyl terephthalate and a diol component comprising at least 65 mole % ethylene glycol at temperatures to effect steps (A) and (B) as follows:

(A) esterification or transesterification, wherein said esterification is carried out, optionally, in the presence of about 1 to about 50, preferably 1 to 20, more preferably 1 to 10 parts of titanium present in the form of an alkyl titanate or optionally, in the presence of a catalyst system comprising from about 1 to about 50, preferably 1 to 20, more preferably 1 to 10 parts of titanium present in the form of an alkyl titanate and from about 1 to about 100, preferably 1 to 50, more preferably 1 to 30, even more preferably 1 to 15 parts of phosphorus in the form of a phosphate ester or phosphoric acid, and wherein said transesterification is carried out in the presence of from about 1 to about 50 parts of titanium in the form of an alkyl titanate; and (B) polycondensation, wherein said polycondensation is carried out in the presence of a catalyst system comprising from about 1 to about 50 parts of titanium present in the form of an alkyl titanate and from about 1 to about 100 parts of phosphorus in the form of a phosphate ester or phosphoric acid;

each of the parts of the catalyst representing per million parts of polymer product, wherein the mole percentage for all of the diacid component totals 100 mole %, and wherein the mole percentage for all of the diol component totals 100 mole %.

In another embodiment of the invention, the process incorporates the use of either an inorganic toner system comprising salts of cobalt and/or an organic toner system comprising about 1 to about 10 ppm of at least one copolymerizable 6-arylamino -1-cyano-3H-dibenz[f,ij] isoquinoline-2,7-dione or at least one copolymerizable blue 1,4-bis(2,6-dialkylanilino) anthraquinone compound in combination with at least one red anthraquinone or anthrapyridone (6-arylamino-3H-dibenz[f,ij]isoquinoline-2, 7-done) compound at a temperature to effect esterification or ester interchange and polycondensation in the presence of a catalyst system comprising from about 1 to about 50 parts of titanium in the form of an alkyl titanate and from about 1 to about 100 parts of phosphorus in the form of a phosphate ester or phosphoric acid, each of the parts of one catalyst system being per million parts at polymer product and the diacid or diester component totaling 100 mole % and the diol component totaling 100 mole %.

Some of the advantages of this invention over the prior art are that: (1) it employs the use of a catalyst system containing low amounts of one or more alkyl titanates in combination with a phosphorus-based compound in order to make poly(ethylene terephthalate) or modified poly(ethylene terephthalate) of sufficient molecular weight to be useful in molding applications, (2) the product has good clarity (less haze) and color, (3) there is a lower amount of metal and acetaldehyde in the final product and (4) obtaining a slow crystallization rate in poly(ethylene terephthalate) or modified poly(ethylene terephthalate).

DETAILED DESCRIPTION OF THE PREFERRED EMBODIMENTS

This invention involves a process of producing a moldable polyethylene terephthalate or modified polyethylene terephthalate having an inherent viscosity greater than 0.65 dL/g, preferably greater than 0.70 dL/g, comprising reacting a diacid or diester component comprising at least 65 mole % terephthalic acid or $C_1$–$C_4$ dialkylterephthalate, preferably at least 70 mole %, more preferably at least 75 mole %, even more preferably, at least 95 mole %, and a diol component comprising at least 65 mole % ethylene glycol, preferably at least 70 mole %, more preferably at least 75 mole %, even more preferably at least 95 mole %. It is also preferable that the diacid component is terephthalic acid and the diol component is ethylene glycol. The mole percentage for all of the diacid component totals 100 mole %, and the mole percentage for all of the diol component totals 100 mole %.

After melt and/or solid phase polycondensation the polyesters have an inherent viscosity (I.V.) of about 0.65 to about 1.2 dL/g, preferably 0.75 dL/g measured at 25° C. in a 60/40 ratio by weight of phenol/tetrachloroethane.

Where the polyester components are modified by one or more diol components other than ethylene glycol, suitable diol components of the described polyesters may be selected from 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol, Z,8-bis(hydroxymethyl)-tricyclo-[5.2.1.0]-decane wherein Z represents 3, 4, or 5; and diols containing one or more oxygen atoms in the chain, e.g., diethylene glycol, triethylene glycol, dipropylene glycol, tripropylene glycol and the like. In general, these diols contain 2 to 18, preferably 2 to 8 carbon atoms. Cycloaliphatic diols can be employed in their cis or trans configuration or as mixtures of both forms. A preferred modifying diol component is 1,4-cyclohexanedimethanol.

Where the polyester components is modified by one or more acid components other than terephthalic acid, the suitable acid components (aliphatic, alicyclic, or aromatic dicarboxylic acids) of the linear polyester may be selected, for example, from isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalenedicarboxylic acid and the like. In the polymer preparation, it is often preferable to use a functional acid derivative thereof such as the dimethyl, diethyl, or dipropyl ester of the dicarboxylic acid. The anhydrides or acid halides of these acids also may be employed where practical.

The linear polyesters may be prepared according to polyester forming conditions well known in the art. The reaction should occur at a temperature to effect esterification and polycondensation. For example, a mixture of one or more dicarboxylic acids, preferably aromatic dicarboxylic acids, or ester forming derivatives thereof, and one or more diols may be heated in the presence of esterification and/or transesterification catalysts at temperatures in the range of about 150° to about 300° C., preferably, about 200° C. to about 300° C., and even more preferably, about 260° C. to about 300° C., and pressures of atmospheric to about 0.2 mm Hg. Normally, the dicarboxylic acid is esterified with the diol(s) at elevated pressure and at a temperature at about 240° C. to about 270° C. Polycondensation then is effected by increasing the temperature and lowering the pressure while excess diol is removed from the mixture.

The reaction is carried out at a temperature to effect esterification or ester interchange and polycondensation in the presence of a catalyst system comprising from about 1 to about 50 parts of titanium in the form of an alkyl titanate and from about 1 to about 100 parts of phosphorus in the form of a phosphate ester or phosphoric acid, each of the parts of the catalyst system representing per million parts of polymer product and the diacid or diester component totaling 100 mole % and the diol component totaling 100 mole %.

Alkyl titanates useful within the context of this invention include: acetyl triisopropyl titanate, titanium tetraisopropoxide, titanium glycolates, titanium butoxide, hexyleneglycol titanate, tetra isooctyl titanate, titanium tetramethylate, titanium tetrabutylate, titanium tetraisopropylate, titanium tetrapropylate, tetrabutyl titanate, and the like. A preferred alkyl titanate is acetyl triisopropyl titanate.

The preferred phosphorus-based compound is a phosphate ester.

It is more preferred that the phosphate ester has the formula

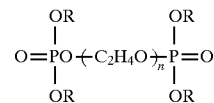

wherein n has an average value of 1.5 to about 3.0 with about 1.8 being most preferred and each R is hydrogen or an alkyl radical having from 6 to 10 carbon atoms with octyl being most preferred, the ratio of the number of R groups or hydrogen atoms to the number of phosphorus atoms being about 0.25 to 0.50 with about 0.35 being most preferred; and the ester having a free acidity equivalent of about 0.2 to 0.5.

Other phosphate esters useful in this invention include ethyl acid phosphate, diethyl acid phosphate, triethyl acid phosphate, arylalkyl phosphates, tris-2-ethylhexyl phosphate and the like.

Another preferred phosphorus-based compound is phosphoric acid.

It is preferred that the catalyst system of the invention comprises about 3 to about 10 parts of catalyst metal in the form of tetraisopropyl titanate and from about 5 to about 15 parts of phosphorus in the form of said phosphorus-based compound.

It is preferred in the process of this invention that the catalyst system further comprises an inorganic toner or an organic toner. Where the toner is an inorganic one, salts of cobalt are preferred. The cobalt toner is usually added after the esterification step before polycondensation when a diacid is reacted. In the case of the reaction at a diester, the toner may be present during transesterification and during the polycondensation step.

Examples of suitable cobalt salts are cobaltous acetate trihydrate, cobaltous nitrate, cobaltous chloride, cobalt acetylacetanoate, cobalt naphthenate, and cobalt salicyl salicylate and cobalt acetate. It is preferred that the salt of cobalt is cobalt acetate.

When the cobalt salt is cobalt acetate, it is preferable that the cobalt acetate is present in the amount of 10–120 ppm Co, the acetyl triisopropyl titanate is present in the amount of 1–50 ppm Ti, and the phosphorus-based compound is present in the amount of 1–100 ppm phosphorus, all parts by weight based on the total weight of the polymer.

Where the toner is an organic one, it is preferred that the toner is an organic toner system comprising about 1 to about 10 ppm of at least one copolymerizable 6-arylamino-1-cyano-3H-dibenz[f,ij]isoquinoline-2,7-dione or at least one copolymerizable 1,4-bis(2,6-dialkylanilino) anthraquinone compound in combination with at least one bis anthraquinone or bis anthrapyridone(6-arylamino-3H-dibenz[f,ij]isquinoline-2,7-done) compound, wherein the organic toners contain at least one, preferably two polyester reactive groups.

A preferred organic toner comprises at least one 6-arylamino-1-cyano-3H-dibenz[f,ij]isoquinoline-2,7-diones having the formulae

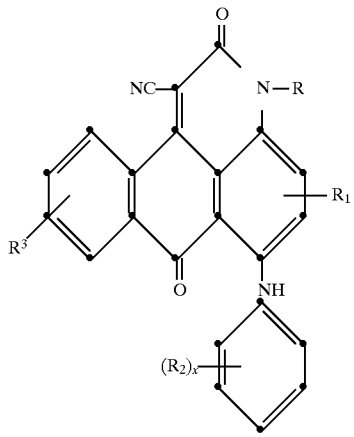

wherein

R is hydrogen, cycloalkyl, allyl, alkyl, aryl, aralkyl, alkoxyalkyl or cycloalkylalkylene;

$R_1$ is hydrogen, halogen, alkyl, alkoxy, aryloxy, alkylthio or arylthio;

$R_2$ is hydrogen, halogen, alkyl, aryl, alkoxy, aryloxy, alkylthio, arylthio, carbalkoxy, carbaryloxy, carbaralkoxy, carboxy, sulfamoyl, alkylsulfamoyl, dialkylsulfamoyl, alkylarylsulfamoyl, cycloalkylsulfamoyl, arylsulfamoyl, carbamoyl, alkylcarbamoyl, dialkylcarbamoyl, alkylarylcarbamoyl, cycloalkylcarbamoyl, arylcarbamoyl, 2-pyrrolidono, acylamido, or N-alkylacylamido;

$R_3$ is one or more residues selected from the group consisting of hydrogen, halogen, alkyl and alkoxy; and x is an integer of 1 to 5; wherein one or more of the alkyl, alkoxy, alkoxy, aryl, aryloxy, alkylthio, arylthio or aralkyl residues may contain one or more reactive groups selected from the group consisting of carboxy, carbalkoxy, carbaryloxy, N-alkyl-carbamoyloxy, carbamoyloxy, acyloxy, chlorocarbonyl, hydroxyl, cycloalkylcarbonyloxy, N-arylcarbamoyloxy and N,N-dialkylcarbamoyloxy and wherein said alkyl and aryl groups may contain substituents selected from the group consisting of alkoxy, acyloxy, cyano, hydroxy, halogen and acylamido; wherein at least one polyester reactive group is present to permit copolymerization. These toners are disclosed in U.S. Pat. No. 4,754,174, which is incorporated herein by reference in its entirety.

Even more preferably, the organic compound useful in this invention when copolymerized is

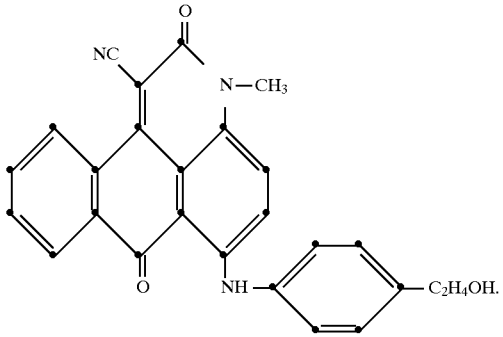

The preferred organic toner system of this invention are certain blue substituted 1,4-bis(2,6-dialkylanilino) anthraquinones in combination with selected red anthraquinone and anthrapyridone (3H-dibenz[fi,j] isoquinoline-2,7-dione) compounds as disclosed in U.S. Pat. No. 5,372,864 which is hereby incorporated by reference in its entirety.

More particularly, this organic toner system is comprised of at least one blue 1,4-bis(2,6-dialkylanilino) anthraquinone(s) of formula (I):

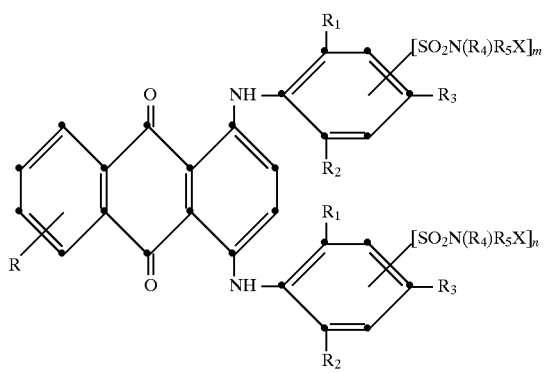

wherein:

R is selected from the group consisting of hydrogen, $C_1$–$C_6$ alkyl, halogen, carboxy, and

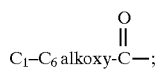

$R_1$ and $R_2$ are independently $C_1$–$C_6$-alkyl;

$R_3$ is selected from the group consisting of hydrogen, halogen, $C_1$–$C_6$-alkyl, substituted $C_1$–$C_6$ alkyl, hydroxy, $C_1$–$C_6$-alkoxy, substituted $C_1$–$C_6$-alkoxy, cyano, thiocyano, $C_1$–$C_6$-alkylthio, substituted $C_1$–$C_6$-alkylthio, $C_1$–$C_6$-alkylsulfonyl, substituted $C_1$–$C_6$-alkylsulfonyl, $C_1$–$C_6$-alkoxycarbonyl, carboxy, aryloxy, arylthio, arylsulfonyl, and $SO_2N(R_4)R_5X$ when m and/or n are zero;

$R_4$ is selected from the group consisting of hydrogen, $C_1$–$C_6$-alkyl, substituted $C_1$–$C_6$-alkyl, $C_3$–$C_8$-alkenyl, $C_3$–$C_8$-alkynyl, $C_3$–$C_7$-cycloalkyl and aryl;

$R_5$ is a linking group selected from the group consisting of $C_1$–$C_8$-alkylene, $C_1$–$C_6$-alkylene-Z-$C_1$–$C_6$-alkylene, arylene-$C_1$–$C_6$-alkylene, arylene-Z-$C_1$–$C_6$-alkylene, $C_3$–$C_7$-cycloalkylene, $C_1$–$C_6$-alkylene-cyclo-alkylene-$C_1$–$C_6$-alkylene, $C_1$–$C_6$-alkylene-arylene-$C_1$–$C_6$-alkylene, and $C_1$–$C_6$-alkylene-Z-arylene-Z-$C_1$–$C_6$-alkylene, wherein Z is selected from —O—, —S— or $SO_2$;

X is hydrogen or a polyester reactive group; and m and n are independently 0 or 1; with the proviso that at least one polyester reactive group is present.

The red components which may be blended with blue components of formula I above have the following structural formulae II–X:

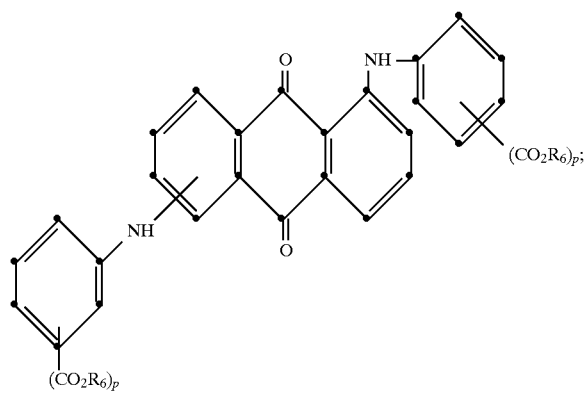

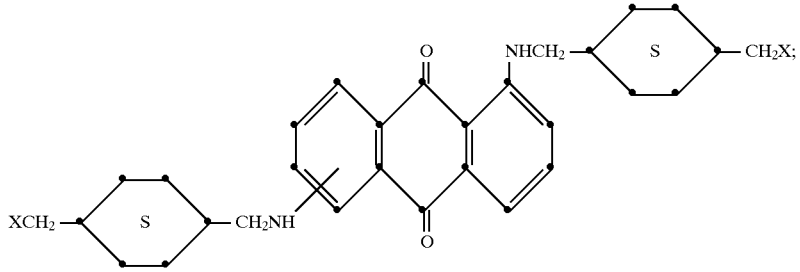

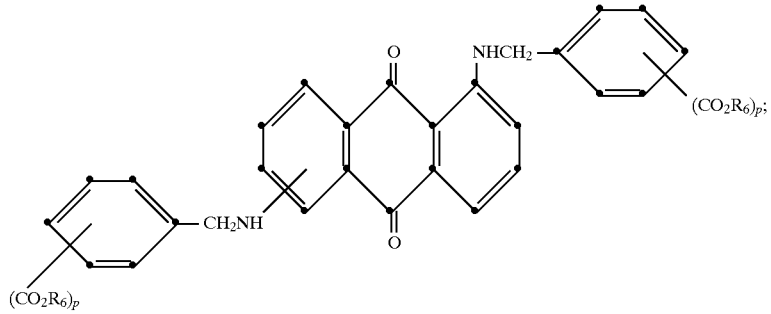

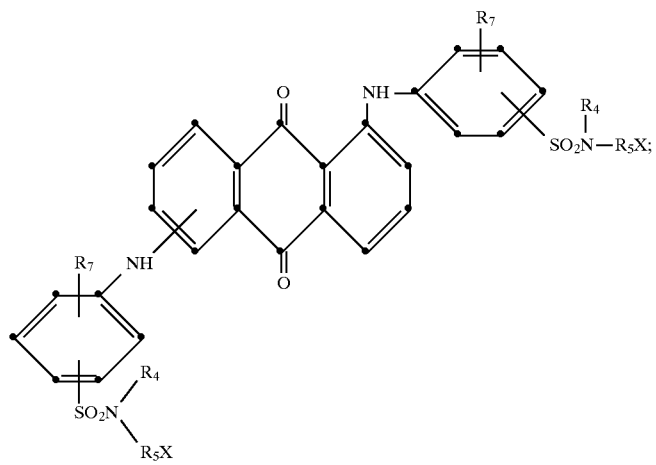
V
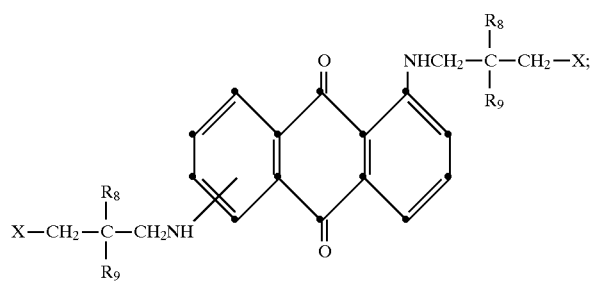
VI
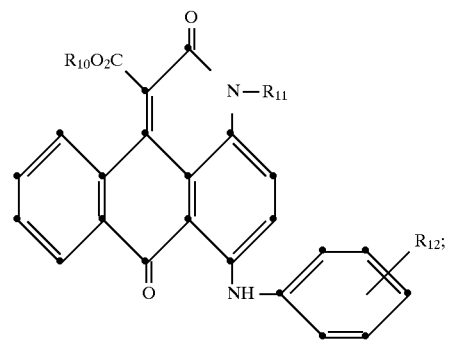
VII
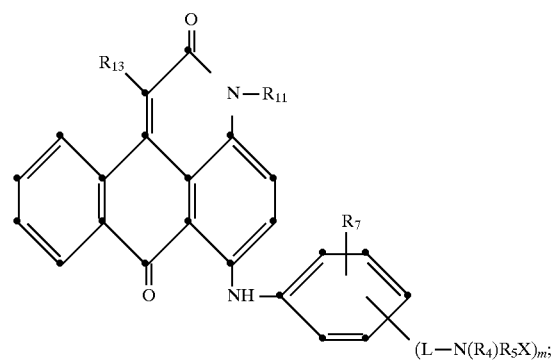
VIII

-continued

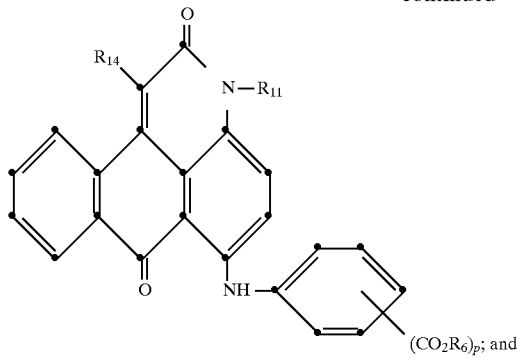

(CO₂R₆)ₚ; and

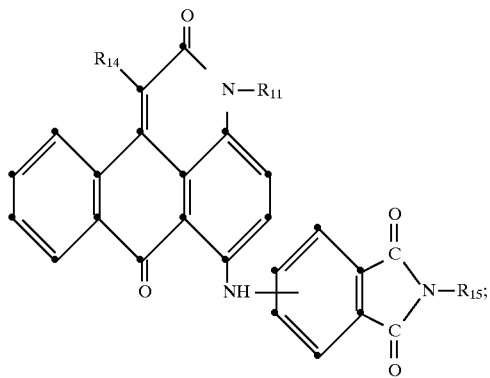

wherein:

$R_6$ is selected from the group consisting of hydrogen, $C_1$–$C_6$-alkyl, substituted $C_1$–$C_6$-alkyl, $C_3$–$C_7$-cycloalkyl or aryl;

$R_7$ is hydrogen or one to three groups selected from $C_1$–$C_6$-alkyl, substituted $C_1$–$C_6$ alkyl, $C_1$–$C_6$-alkanoylamino, halogen, hydroxy $C_1$–$C_6$-alkyl, $C_1$–$C_6$-alkoxy, $C_1$–$C_6$-alkylthio;

$R_8$ and $R_9$ are the same or different and are selected from the group consisting of $C_1$–$C_6$-alkyl, substituted $C_1$–$C_6$-alkyl, $C_3$–$C_7$-cycloalkyl or aryl;

$R_{10}$ is selected from the group consisting of $C_1$–$C_6$-alkyl, $C_3$–$C_7$-cycloalkyl or aryl;

$R_{11}$ is selected from the group consisting of hydrogen, $C_1$–$C_{12}$-alkyl, substituted $C_1$–$C_{12}$-alkyl, $C_3$–$C_7$-cycloalkyl and aryl;

$R_{12}$ is hydrogen or one to three groups selected from the group consisting of $C_1$–$C_6$-alkyl, substituted $C_1$–$C_6$-alkyl, $C_1$–$C_6$-alkoxy, substituted $C_1$–$C_6$-alkoxy, $C_1$–$C_6$-alkylthio, substituted $C_1$–$C_6$-alkylthio, halogen, hydroxy, $C_1$–$C_6$-alkanoylamino, aroylamino, $C_1$–$C_6$-alkylsulfonylamino and arylsulfonylamino;

$R_{13}$ and $R_{14}$ are selected from hydrogen, cyano or $CO_2R_{10}$;

$R_{15}$ is $R_4$ or $R_5X$ as previously defined;

L is —CO— or —SO₂—; X is as previously defined; m is 0 or 1; p is 1 or 2; with the provisos that $R_{13}$ is hydrogen when m is 0 and at least one polyester reactive group is present.

In a preferred embodiment, the blue anthraquinone compound(s) correspond to structure (I) above, wherein R is hydrogen; $R_1$ and $R_2$ are independently selected from methyl and ethyl; $R_3$ is hydrogen, methyl, or bromo; $R_4$ is hydrogen, $C_1$–$C_4$-alkyl or aryl; $R_5$ is selected from the group consisting of $C_1$–$C_6$-alkylene, $C_1$–$C_4$-alkylene-O-$C_1$–$C_4$-alkylene, —CH₂C₆H₁₀CH₂—, arylene, or —CH₂-alkylene- and the red component corresponds to formula (V), wherein $R_7$ is $C_1$–$C_6$-alkoxy and $R_4$ and $R_5$ are as defined in claim 1.

In an especially preferred embodiment of the present invention, the blue compound of formula (I) is

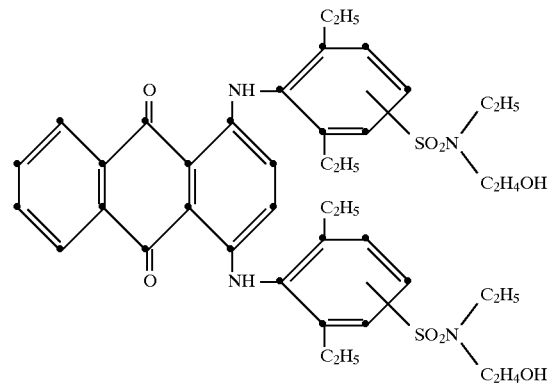

and the red compound of formula (V) is

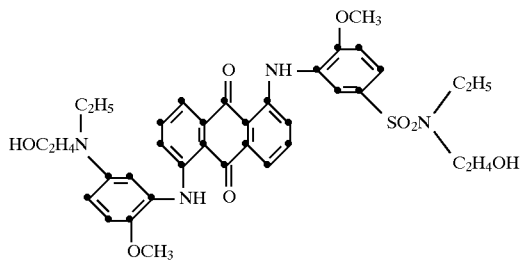

In a further preferred embodiment, the concentration of blue and red compounds taken together is from about 0.5 ppm to about 10 ppm. Most preferably, the total concentration of blue compound is 1 to 7 ppm and total concentration of red compound is 0.5 to 3 ppm.

The term "polyester reactive group" is used herein to describe a group which is reactive with at least one of the functional groups from which the polyester is prepared under polyester forming conditions. Examples of the groups which X may represent include hydroxy, carboxy, an ester group, amino, $C_1$–$C_6$-alkylamino, etc. The ester radicals may be any radical having the formulae

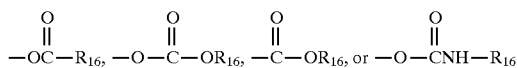

wherein $R_{16}$ is selected from the group consisting of $C_1$–$C_6$-alkyl, substituted $C_1$–$C_6$-alkyl, $C_3$–$C_7$-cycloalkyl or aryl. Reactive group X is preferably hydroxy, carboxy, $C_1$–$C_2$-alkoxycarbonyl or acetoxy.

In the terms "substituted $C_1$–$C_6$-alkyl", "substituted $C_1$–$C_{12}$-alkyl", "substituted $C_1$–$C_6$-alkoxy", "substituted $C_1$–$C_6$-alkylthio", "substituted $C_1$–$C_6$-alkylsulfonyl", "$C_1$–$C_6$-alkylsulfonylamido", "substituted alkylene", "$C_1$–$C_6$-alkoxycarbonyl", the alkyl and alkylene groups or portions of the groups may contain as further substituents one or more groups, preferably one to three groups selected from the group consisting of hydroxy, halogen, cyano, aryl, aryloxy, arylthio, $C_1$–$C_4$-alkylthio, $C_1$–$C_4$-alkylthio, $C_3$–$C_7$-cycloalkyl, $C_1$–$C_4$-alkanoyloxy and —(—O—$R_{17}$—)$_p$— $R_{18}$, wherein $R_{17}$ is selected from the group consisting of $C_1$–$C_6$-alkylene, $C_1$–$C_6$-alkylenearylene, cyclohexylene, arylene, and $C_1$–$C_6$-alkylenecyclohexylene; $R_{18}$ is selected from the group consisting of hydrogen, hydroxy, carboxy, $C_1$–$C_4$-alkanoyloxy, $C_1$–$C_4$-alkoxycarbonyl, aryl, and $C_3$–$C_7$-cycloalkyl; and p is 1, 2, 3, or 4.

The term "aryl" as used herein preferably denotes phenyl and phenyl substituted with one to three substituents selected from the group consisting of $C_1$–$C_6$-alkyl, $C_1$–$C_6$-alkoxy, halogen, carboxy, cyano, $C_1$–$C_6$-alkylthio, $C_1$–$C_6$-alkylsulfonyl, trifluoromethyl, hydroxy, $C_1$–$C_6$-alkanoyloxy, $C_1$–$C_6$-alkanoylamino, and $C_1$–$C_6$-alkoxycarbonyl.

The term "arylene" includes 1,2-,1,3- and 1,4-phenylene and such radicals substituted one to three times with $C_1$–$C_6$-alkyl, $C_1$–$C_6$-alkoxy, $C_1$–$C_6$-alkoxycarbonyl, or halogen.

The terms "$C_3$–$C_8$-alkenyl" and "$C_3$–$C_8$-alkynyl" are used to denote aliphatic hydrocarbon moieties having 3–8 carbons and containing at least one carbon-carbon double bond and one carbon-carbon triple bond, respectively.

The term "halogen" is used to indicate bromine, chlorine, fluorine, and iodine.

The terms "$C_1$–$C_6$-alkanoyloxy" and "$C_1$–$C_6$-alkanoylamino" are used to represent radicals of the formulae

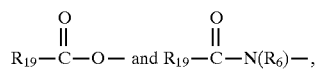

respectively, wherein $R_{19}$ is a straight or branched chain $C_1$–$C_6$-alkyl radical and $R_6$ is as defined above.

Thus, the present invention provides a molding or fiber grade polyester preferably having copolymerized therein, in an amount sufficient to improve the apparent whiteness and/or clarity of the polyester, a blue 1,4-bis(2,6-dialkylanilino)anthraquinone compounds of Formula (I) plus a red anthraquinone or anthrapyridone compounds of formulae (II)–(X) above. In this regard, the blue and red compounds will not be present in an amount sufficient to impart a substantial amount of color to the polyester.

The organic toners may be added before the esterification, transesterification or polycondensation steps. As a further aspect of the present invention, the method provided herein also involves the step of imparting clarity to the poly(ethylene terephthalate) or modified poly(ethylene terephthalate) of the invention.

In yet another aspect of the invention, there is provided in the method of polymerization, in the melt, of an aromatic polycarboxylic acid or anhydride with a glycol using titanium compound catalysts to form high molecular weight linear polymers, the improvement comprising (a) esterifying the acid or anhydride with the glycol in the presence or absence of from about 1 ppm of Ti to about 50 ppm of Ti as an alkyl titanate at a temperature of between about 197° C. and about 300° C. for a period of from about 0.5 hours to about 7 hours at a pressure of between about 0 psig and about 100 psig at a molar ratio of glycol to acid or anhydride of about 1.1:1 to about 3:1, (b) further reacting and polycondensing the product of step (a) which contains the above mentioned titanium catalyst, in contact with a phosphorus based compound at about 1 to about 100 ppm phosphorus at a temperature of from about 250° to 310° C., under vacuum of from about 0.1 Torr to about 200 Torr for a period of from about 0.5 hour to 12.0 hours while removing the products of condensation so that the resulting polymer has an intrinsic viscosity between about 0.4 to about 1.2 and contains less that 5 percent by weight diethylene glycol, without adding a diethylene glycol inhibitor, with each of the parts of the compound being per million parts of the first polymer product and (c) further polycondensing the crystallized product of step (b) in the solid-state and in the presence of countercurrent inert gas or under vacuum and at elevated temperatures of from about 200° C. to about 235° C. for 2–24 hours.

Molded articles or fibers can be prepared from the product of the invention. Containers are the preferred molded article.

As noted above, the toner blends of the present invention can be added before or during polymerization.

Accordingly, as a further aspect of the present invention, there is provided a premix composition comprising a blend of at least one blue 1,4-bis(2,6-dialkylanilino)anthraquinone compound of formula (I), along with a red anthraquinone or anthrapyridone compound of formulae (II)–(X) above. The premix composition may be a neat blend of the red and blue compounds or the composition may be pre-dissolved in one of the polyester's monomeric species, e.g., ethylene glycol.

The total amount of toner components added depends, of course, on the amount of inherent yellow color in the polyester. Generally, a maximum concentration of about 10 ppm of combined toner components and a minimum concentration of about 0.5 ppm are required with about 1–7 ppm of blue component (I) in combination with about 0.5–3 ppm of red components of formulae (II–X) being preferred.

The blue anthraquinones of formula (I) can be prepared in general by reaction of leuco quinizarin (1,4,9,10-tetrahydroxyanthracene) compounds with an excess of aromatic amines, preferably in the presence of acid catalysts such as boric acid as described in U.S. Pat. No. 3,918,976, incorporated herein by reference and as follows:

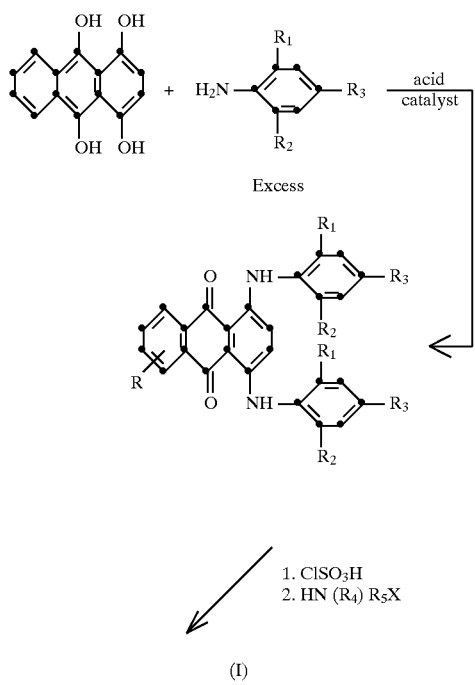

(I)

The 1,4-bis(2,6-dialkylanilino)anthraquinone compounds thus produced are readily functionalized if needed by first chlorosulfonating with chlorosulfonic acid to produce di-sulfonyl chlorides which can be reacted with amines containing polyester reactive groups, the general method being disclosed in U.S. Pat. No. 2,731,476, incorporated herein by reference.

Typical amines corresponding to formula $HN(R_4)R_5X$ include 2-aminoethanol, 2,2-iminodiethanol, 1-amino-2,3-propanediol, 2-methylaminoethanol, 2-ethylaminoethanol, 2-anilinoethanol, methyl anthranilate, methyl m-amino benzoate, p-aminobenzoic acid, m-aminophenol, 6-aminohexanoic acid, β-alanine, glycine ethyl ester, 2-(p-aminophenyl)ethanol, 2-(p-aminophenoxy)ethanol 4-aminomethylcyclohexane methanol and 3-amino-2,2-dimethyl-1-propanol.

Red compounds (II) can be prepared by reacting 1,5-dichloroanthraquinone and/or 1,8-dichloroanthraquinone or mixtures thereof with o, m- and p-aminobenzoic acids (and esters thereof) by a modified Ullmann reaction involving nitrogen arylation of the anilines in the presence of copper catalysts (see U.S. Pat. No. 4,359,580, incorporated herein by reference).

Red compounds of formula (III) can be prepared as described in U.S. Pat. No. 4,420,581 and compounds of formula (VI) can be prepared as in U.S. Pat. No. 4,999,418, incorporated herein by reference.

Red anthraquinone compounds of formula (IV) can be prepared by reacting 1,5-dichloroanthraquinone and 1,8-dichloroanthraquinone or mixtures thereof with substituted benzyl amines by procedures similar to those used in preparing compounds of formulae (III) and (VI).

Red anthrapyridone compounds (VII) can be prepared as disclosed in U.S. Pat. No. 4,790,581 incorporated herein by reference; procedures useful in preparing red-violet anthrapyridone compounds (VIII) and (IX) are disclosed in U.S. Pat. No. 4,745,174, incorporated herein by reference.

Haze half-times are defined as the time after the start of crystallization of a material when the level of haze becomes such that the amount of light transmitted through a film of the sample reaches half of its maximum value. This halftime is roughly the same as the crystallization half-times known in the art. Examples of measurements of crystallization half-times are disclosed in J. Polymer Sci. A2, Vol. 6 (1962) by Adams and Stein.

A haze half time test has been found to be useful in determining haze results in molded preforms. It has been found to be an excellent measure of crystallization rate with respect to bottle polymer applications. Polymers with higher haze half times are less likely to contain haze in preforms. In this test, a hazemeter is used to measure the light absorbance of a molten polymer film as it crystallizes and becomes more turbid (hazy); the resulting turbidity verses time data are analyzed to obtain a half time. The haze half time test has been used to measure the crystallization rate in the experimental section as follows below. This invention involves a process for preparing polyesters having a slow crystallization rate, using TPA as the primary source of the terephthalate moiety, long melt phase polycondensation times, and a catalyst system as described herein.

The haze half-times referred to in the following examples are measured by method described as follows:

The polymer sample (a fine powder) is melted for about 20 seconds between 2 aluminum blocks heated to about 280° C. The sample is transferred to a set of 2 aluminum blocks heated to about 130° C. Light is transmitted from a projector lamp which is sent through the sample as it crystallizes isothermally and the light intensity is measured using a photodetector. The photodetector signal is recorded using a computer and is analyzed to determine the time after the start of crystallization when the level of haze becomes such that the amount of light transmitted through a film of the sample reaches half of its maximum.

Polymer prepared using this process has a significantly higher haze half time than polymer prepared by conventional processes such antimony (Sb) based catalyst combined with phosphorus (see attached Table 1). Polymer prepared by the process described in this invention is useful for obtaining poly(ethylene terephthalate) or modified poly (ethylene terephthalate) with a slow crystallization rate for molding haze free preforms which are used to blow mold bottles of different sizes.

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise indicated.

EXAMPLES

Example 1

Preparation of Terephthalic Acid (TPA) Based Oligomer

Ethylene glycol (450 lbs) was placed in a paste preparation vessel. The agitator of the vessel was started. TPA powder (1050 lbs) was added slowly at a rate of 30 lbs/min. The paste was allowed to circulate for 1 hr with a heating loop on the vessel maintained at 40° C. to obtain a slurry. The slurry was feed at a rate of 4 lbs/hr to obtain a total feed of 493 lbs into an esterification vessel which contained a heal from a previous run and was at 250° C. This vessel was equipped with a stirrer and a low boiler column to collect distillates. The temperature was ramped from 250° C. to 265° C. in 1 hr after feeding all of the ethylene glycol/TPA slurry. The pressure of the vessel was built to 25 psig and maintained. The esterification reaction was allowed to proceed until the level of water in the low boiler column was at a steady state. A portion of the final oligomer was dumped into metal cans and allowed to cool. The final oligomer was ground to 3 to 5 mm particle size. The oligomer had an acid number of 5.40 and was found by analysis to contain 71.43 equivalents carboxyl per million grams. The $M_n$ by GPC was 953 and the $M_w$ by GPC was 1470.

Example 2

Preparation of PET Precursor Using Sb/P Catalyst

The following materials were placed in a stainless steel reactor equipped with a nitrogen inlet, stirrer, and vacuum outlet.

1090 g TPA based oligomer described in Example 1

0.0029 g 1-cyano 6-[4'-(2-hydroxyethyl)anilino]-3H-dibenz[f,ij]isoquinoline-2,7-dione 0.0318 g antimony trioxide 10.2 ml of an ethylene glycol slurry of mixed phosphorus ester compositions (Merpol A) containing 0.07488 g phosphorus 1.4 g of diethylene glycol (2,2'-oxydiethanol)

The temperature of the reactor and contents was elevated from room temperature to 280° C. over a 70 minute time interval with a nitrogen sweep over the reaction mixture. Stirring was begun when the internal temperature of the reaction had reached 220° C. Vacuum was applied at 280° C. The pressure was reduced to 200 torr and was held at 200 torr for 10 minutes. The pressure was reduced to 2.5 torr and the melt phase polycondensation reaction was completed by heating at 2.5 torr for 3 hours. The polymer was extruded from the reactor through ice water in a metal trough into a pelletizer to obtain polymer pellets. The pelletized polymer had an inherent viscosity of 0.57 dL/g and was shown by analysis to contain 2 wt % diethylene glycol (DEG).

Example 3

Solid State Polycondensation of poly(ethylene terephthalate) (PET) from Example 2

PET polymer pellets (160 g) from Example 2 were crystallized in a 180° C. air oven for 45 minutes. The crystallized pellets were placed in a solvent heated glass solid stating apparatus with the nitrogen flow set at 14 SCFH (standard cubic feet per hour). Methyl salicylate was used as the refluxing solvent to yield a solid stating temperature of 222° C. to 223° C. The pellets were allowed to polycondense in the solid state for 3 hrs and 25 min. The resulting polymer had an inherent viscosity of 0.72 dL/g and haze half times of 65 and 70 seconds on duplicate samples.

Example 4

Preparation of PET Precursor Using Ti/P Catalyst

The following materials were placed in a stainless steel reactor equipped with a nitrogen inlet, stirrer, and vacuum outlet.

1090 g TPA based PET oligomer described in Example 1

0.0029 g 1-cyano 6-[4'-(2-hydroxyethyl)anilino]-3H-dibenz[f,ij]isoquinoline-2,7-dione 1.95 g diethylene glycol 0.16 ml acetyltriisopropyl titanate in butanol containing 0.0048 g of Ti 0.6 ml of an ethylene glycol slurry of a mixed ester composition (Merpol A) containing 0.0048 g P The heating, polycondensation, and pelletization were done as described in Example 2 except the final melt phase polycondensation stage was done at 3.25 torr for 3 hours. The final pelletized polymer had an inherent viscosity of 0.58 dL/g and was shown by analysis to contain 1.87 wt % DEG.

Example 5

Solid State Polycondensation of PET from Example 4

PET polymer pellets (160 g) from Example 4 were crystallized and allowed to polycondense in the solid state as described in Example 3 except the solid state polycondensation was done for 4 hours and 39 minutes. The resulting polymer had an inherent viscosity of 0.71 dL/g and haze half times of 126 and 132 seconds on duplicate samples.

As shown in Table I, polymers prepared by the process described in this invention is useful for obtaining a poly (ethylene terephthalate) based polyester with a slow crystallization rate for molding haze preforms which are used to blow mold bottles of different sizes.

TABLE 1

Haze Half Times of PET polymers[a]

| Example Number | Catalyst System[b] (ppm) | Haze Half Time[c] (seconds) |
|---|---|---|
| Example 3 | 227 Sb, 78 P | 65, 70 |
| Example 5 | 5 Ti, 6 P | 126, 132 |

[a]The PET polymers are terephthalic acid based and were prepared using a melt phase polycondensation time of 3 hrs.
[b]The catalyst levels contained in the polymers were determined by X-ray fluorescence analysis.
[c]PET polymers with higher haze half times show less propensity for haze when bottle preforms are molded.

We claim:

1. A process of producing a moldable polyethylene terephthalate or modified polyethylene terephthalate having an inherent viscosity greater than 0.65 dL/g comprising at temperatures to effect steps (a) and (b):
   (a) esterifying a diacid component comprising at least 65 mole % terephthalic acid with a diol component comprising at least 65 mole % ethylene glycol in the absence of a catalyst system to produce an esterification product; and
   (b) polycondensing the esterification product of step (a) in the presence of a catalyst system comprising from about 1 to about 10 parts of titanium present in the form of an alkyl titanate and from about 1 to about 50 parts of phosphorus in the form of a phosphorous compound of a phosphate ester or phosphoric acid,
wherein each of the parts of the catalyst system represents per million parts of polymer product, wherein the mole percentage for all of the diacid component totals 100 mole % and the mole percentage for all of the diol component totals 100 mole %.

2. The process of claim 1 wherein said diacid component comprises at least 95 mole % terephthalic acid and the diol component comprises at least 95 mole % ethylene glycol.

3. The process of claim 1 wherein said diacid component is terephthalic acid and said diol component is ethylene glycol.

4. The process of claim 1 wherein said alkyl titanate is acetyl triisopropyl titanate.

5. The process of claim 1 wherein said phosphorus-based compound is a phosphate ester.

6. The process of claim 5 wherein said phosphate ester has the formula

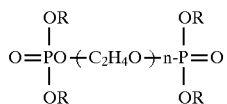

wherein n has an average value of 1.5 to about 3.0 and each R is selected from the group consisting of hydrogen or an alkyl radical having from 6 to 10 carbon atoms, wherein the ratio of the number of R groups or hydrogen atoms to the number of phosphorus atoms being from about 0.25 to about 0.50 and the ester having a free acidity equivalent of about 0.2 to 0.5.

7. The process of claim 5 wherein said phosphate esters comprise ethyl acid phosphate, diethyl acid phosphate, triethyl acid phosphate, arylalkyl phosphates, tris-2-ethylhexyl phosphate and mixtures thereof.

8. The process of claim 1 wherein said phosphorus compound is phosphoric acid.

9. The process of claim 1 wherein said catalyst system comprises about 3 to about 10 parts of catalyst metal in the form of an alkyl titanate and from about 5 to about 15 parts of phosphorus in the form of said phosphorus-based compound.

10. A method for imparting clarity to poly(ethylene terephthalate) or modified polyethylene terephthalate having an inherent viscosity greater than 0.65 dL/g comprising reacting at least 95 mole % of terephthalic acid and at least 95 mole % ethylene glycol at a temperature to effect esterification and in the presence of a catalyst system comprising from about 1 to about 10 parts of titanium in the form of an alkyl titanate and from about 1 to about 50 parts of phosphorus in the form of a phosphorus based compound, each of the parts of the components of said catalyst system being per million parts of polymer product.

11. In the method of polymerization, in the melt, of an aromatic polycarboxylic acid or anhydride with a glycol using titanium compound catalysts to form high molecular weight linear polymers, the improvement comprising
   (a) esterifying the acid or anhydride with the glycol in the presence or absence of from about 1 ppm of Ti to about 50 ppm of Ti as an alkyl titanate at a temperature of between about 197° C. and about 300° C. for a period of from about 0.5 hours to about 7 hours at a pressure of between about 0 psig and about 100 psig at a molar ratio of glycol to acid or anhydride of about 1.1:1 to about 3:1,
   (b) polycondensing the product of step (a) in the presence of a phosphorus based compound at from about 1 to about 50 ppm phosphorus and a titanium compound in the form of an alkyl titanate at from about 1 to about 20 ppm titanium at a temperature of from about 250° to 310° C., under vacuum of from about 0.1 Torr to about 200 Torr for a period of from about 0.5 hour to 12.0 hours while removing the products of condensation wherein the resulting polymer has an intrinsic viscosity between about 0.4 to about 1.2 and contains less that 5 percent by weight diethylene glycol, without adding a diethylene glycol inhibitor, with each of the parts of the compound being per million parts of the first polymer product and
   (c) further polycondensing the crystallized product of step (b) in the solid-state and in the presence of an inert gas or under vacuum and at temperatures of from about 200° C. to about 235° C. for 2–24 hours.

12. A product prepared by the process of claim 1.
13. The product of claim 12 which is clear.
14. A molded article prepared from moldable poly (ethylene terephthalate) made by the process of claims 9 or 1.
15. The molded article of claim 12 which is a container.
16. A process of producing a moldable polyethylene terephthalate or modified polyethylene terephthalate having an inherent viscosity greater than 0.65 dL/g comprising at temperatures to effect steps (a) and (b):
   (a) esterifying a diacid component comprising at least 65 mole % terephthalic acid with a diol component comprising at least 65 mole % ethylene glycol in the presence of a first catalyst system to produce an esterification product, wherein the first catalyst system comprises:
      (i) from about 1 to about 10 parts of titanium present in the form of an alkyl titanate, or
      (ii) from about 1 to about 10 parts of titanium present in the form of an alkyl titanate and from about 1 to about 50 parts of phosphorus in the form of a phosphorous compound of a phosphate ester or phosphoric acid, and
   (b) polycondensing the esterification product of step (a) in the presence of a second catalyst system comprising from about 1 to about 10 parts of titanium present in the form of an alkyl titanate and from about 1 to about 50 parts of phosphorus in the form of a phosphorous compound of a phosphate ester or phosphoric acid,
wherein each of the parts of the first and second catalyst systems represents per million parts of polymer product, wherein the mole percentage for all of the diacid component totals 100 mole % and the mole percentage for all of the diol component totals 100 mole %.

17. The process of claim 16, wherein the diacid component comprises at least 95 mole % terephthalic acid and the diol component comprises at least 95 mole % ethylene glycol.

18. The process of claim 16, wherein the diacid component is terephthalic acid and the glycol component is ethylene glycol.

19. The process of claim 16, wherein the alkyl titanate is acetyl tetraiisopropyl titanate.

20. The process of claim 16, wherein the phosphorous compound is a phosphate ester.

21. The process of claim 20, wherein the phosphate ester has the formula

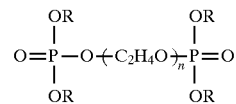

wherein n has an average value of 1.5 to about 3.0 and each R is selected from the group consisting of hydrogen or an alkyl radical having from 6 to 10 carbon atoms, wherein the ratio of the number of R groups or hydrogen atoms to the number of phosphorous atoms being from about 0.25 to about 0.50 and the ester having a free acidity equivalent of about 0.2 to 0.5.

22. The process of claim 20, wherein the phosphate ester comprises ethyl acid phosphate, diethyl acid phosphate, triethyl acid phosphate, an arylalkyl phosphate, tris-2-ethylhexyl phosphate, or a mixture thereof.

23. The process of claim 16, wherein the phosphorous compound is phosphoric acid.

24. The process of claim 16, wherein the first catalyst system and the second catalyst system each comprise from about 3 to about 10 parts of a catalyst metal in the form of an alkyl titanate and the first catalyst system of step (a)(ii) and the second catalyst system each comprise from about 5 to about 15 parts of phosphorous in the form of the phosphorous compound.

25. A process of producing a moldable polyethylene terephthalate or modified polyethylene terephthalate having an inherent viscosity greater than 0.65 dL/g comprising at temperatures to effect steps (a) and (b):

(a) transesterifying a diester component comprising at least 65 mole % $C_1$–$C_4$ dialkyl terephthalate with a diol component comprising at least 65 mole % ethylene glycol in the presence of a first catalyst system comprising from about 1 to about 10 parts of titanium in the form of an alkyl titanate to produce a transesterification product; and (b) polycondensing the transesterification product of step (a) in the presence of a second catalyst system comprising from about 1 to about 10 parts of titanium present in the form of an alkyl titanate and from about 1 to about 50 parts of phosphorus in the form of a phosphorous compound of a phosphate ester or phosphoric acid, wherein each of the parts of the first and second catalyst systems represents per million parts of polymer product, wherein the mole percentage for all of the diester component totals 100 mole % and the mole percentage for all of the diol component totals 100 mole %.

26. The process of claim 25, wherein the diester component comprises at least 95 mole % $C_1$–$C_4$ terephthalate and the diol component comprises at least 95 mole % ethylene glycol.

27. The process of claim 25, wherein the alkyl titanate is acetyl tetraiisopropyl titanate.

28. The process of claim 25, wherein the phosphorous compound is a phosphate ester.

29. The process of claim 28, wherein the phosphate ester has the formula

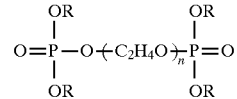

wherein n has an average value of 1.5 to about 3.0 and each R is selected from the group consisting of hydrogen or an alkyl radical having from 6 to 10 carbon atoms, wherein the ratio of the number of R groups or hydrogen atoms to the number of phosphorous atoms being from about 0.25 to about 0.50 and the ester having a free acidity equivalent of about 0.2 to 0.5.

30. The process of claim 28, wherein the phosphate ester comprises ethyl acid phosphate, diethyl acid phosphate, triethyl acid phosphate, an arylalkyl phosphate, tris-2-ethylhexyl phosphate, or a mixture thereof.

31. The process of claim 25, wherein the phosphorous compound is phosphoric acid.

32. The process of claim 25, wherein the first catalyst system comprises from about 3 to about 10 parts of a catalyst metal in the form of an alkyl titanate and the second catalyst system comprises from about 3 to about 10 parts of a catalyst metal in the form of an alkyl titanate and from about 5 to about 15 parts of phosphorous in the form of the phosphorous compound.

* * * * *